Nov. 8, 1955     A. B. WINK     2,723,005
WHEEL CHOCKS
Filed July 20, 1953
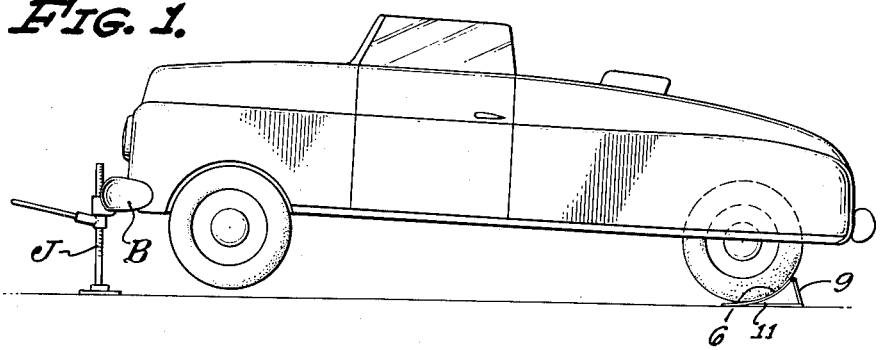
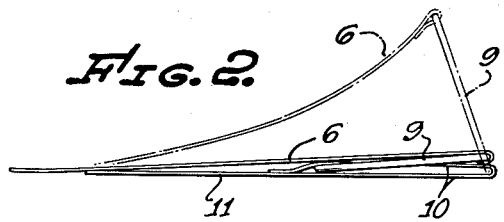
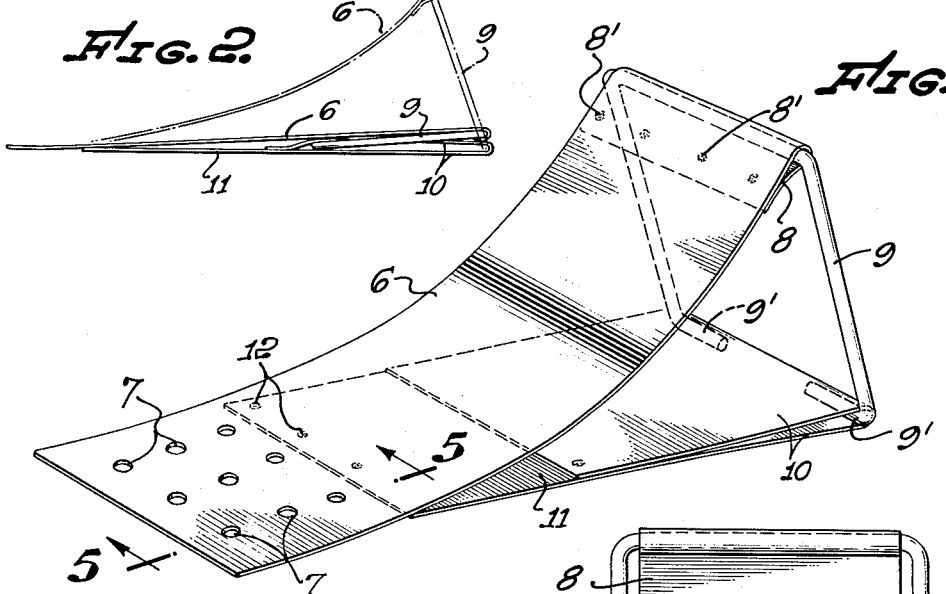
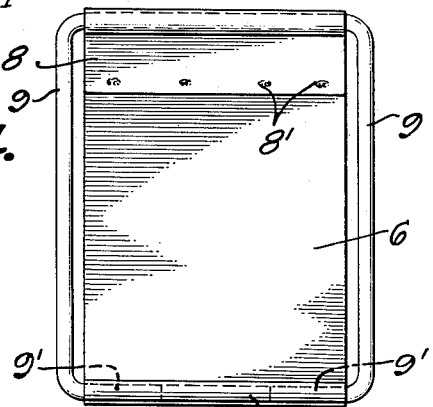
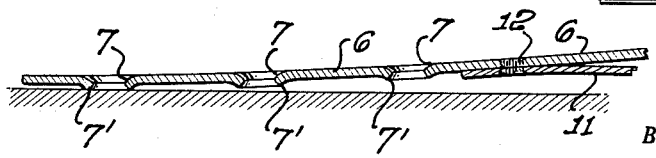
INVENTOR.
ARTHUR B. WINK,
BY
ATTORNEY

United States Patent Office 2,723,005
Patented Nov. 8, 1955

2,723,005

WHEEL CHOCKS

Arthur B. Wink, Los Angeles, Calif.

Application July 20, 1953, Serial No. 368,932

1 Claim. (Cl. 188—32)

This invention relates to wheel chocks, and more particularly to a foldable wheel chock to be conveniently carried in an automobile, for example, and opened quickly for use under a wheel when the automobile is being jacked up, as by means of the bumper, thus preventing the automobile from moving during the jacking-up operation.

Among the salient objects of the invention are: to provide a simple and economical wheel chock, preferably made of sheet metal, and so constructed and arranged that it can be folded into flat condition for storing, or quickly opened for use without any tools;

To provide a wheel chock having means to dig into the pavement when the wheel is thereupon, whereby to insure against slipping or movement of the chock when the automobile is being jacked up for any purpose whatever.

Other advantages will be apparent from the following more detailed description of the invention, taken with the accompanying drawing, showing one practical embodiment of the invention. In the drawing:

Figure 1 is a view of an automobile with the wheel chock in use as the automobile is being jacked up by the front bumper;

Figure 2 is an edge view of a wheel chock embodying the invention in its folded or collapsed condition, being shown in operating position in light broken lines;

Figure 3 is an enlarged perspective view of the invention;

Figure 4 is an open end view of the invention; and

Figure 5 is a fragmentary sectional view taken on line 5—5, on Fig. 3.

Referring now in detail to the drawing, the invention as here shown for explanatory purposes, consists of a spring metal plate 6, having its lower end punched to provide a series of holes, 7, 7, forming projecting gripping edges, as 7', 7', on the under side of said plate to grip the pavement and hold against movement thereon.

The upper end of said plate 6 is folded upon itself, as shown at 8, and is spot welded at 8', to receive a link or loop 9, as clearly illustrated in Figs. 3 and 4. Said link or loop 9 has its two ends bent to angles, in alinement with each other, as at 9', and inserted into the long loop 10, formed in another plate 11, the end of which is shown spot welded, as at 12, to the top plate 6, as shown in Figs. 3 and 5.

In Fig. 1 a jack J is shown in use under a bumper B for lifting the front wheels of the automobile, and the wheel chock is shown in place under the rear wheel, whereby the car cannot be moved rearwardly.

It will be noted that the link or loop member 9, when in its operating position, is inclined slightly forwardly, and when the wheel is on the top plate, said link is moved into a more inclined position, thus making sure of non-collapse in use.

The chock is folded into flat condition by simply moving the lower end of the link or loop 9 forwardly in the long loop 10, in the lower member, whereupon the top member moves down flatwise upon the lower member.

I am aware that changes in the details of construction and arrangement can be made without departing from the spirit of the invention, and I do not, therefore, limit the invention except as it may be limited by the hereto appended claim forming a part of this specification and application.

I claim:

A wheel chock including a top member and a bottom member secured flatwise together at their forward ends, said members being made of sheet metal, said top member having a link receiving loop at its upper end and said bottom member having a long loop at its rearward end, and a link pivotally connected to the loop on said upper member at one end and at its lower end slidably connected in said long loop in said bottom member, to hold said members spread apart at their rearward ends in the form of a wedge, the lower end of said link being slidable forwardly in said long loop to collapse said top and bottom members flatwise together.

References Cited in the file of this patent

UNITED STATES PATENTS

| 1,149,006 | Weaver | Aug. 3, 1915 |
| 1,768,265 | Nicholls | June 24, 1930 |
| 2,475,111 | Ridland | July 5, 1949 |
| 2,481,065 | Auten | Sept. 6, 1949 |

FOREIGN PATENTS

| 457,706 | Germany | June 29, 1927 |